United States Patent [19]
Hodan

[11] Patent Number: 5,137,369
[45] Date of Patent: Aug. 11, 1992

[54] STATIC MIXING DEVICE

[76] Inventor: John A. Hodan, 4 Glenwood Cir., Arden, N.C. 28704

[21] Appl. No.: 642,813

[22] Filed: Jan. 18, 1991

[51] Int. Cl.⁵ .............................................. B01F 5/06
[52] U.S. Cl. .................................... 366/340; 366/337
[58] Field of Search ............... 366/336, 337, 338, 340, 366/341; 425/131.5

[56] References Cited

U.S. PATENT DOCUMENTS

| | | |
|---|---|---|
| 2,815,532 | 12/1957 | Braunlich . |
| 3,457,342 | 7/1969 | Parr et al. . |
| 3,458,900 | 8/1969 | Shinkai et al. . |
| 3,469,279 | 9/1969 | Hudgell . |
| 3,701,619 | 10/1972 | Appeldoorn et al. . |
| 3,856,270 | 12/1974 | Hemker ................................ 366/340 |
| 3,881,701 | 5/1975 | Schoenman ......................... 366/340 |
| 3,968,307 | 7/1976 | Matsui et al. . |
| 4,134,954 | 1/1979 | Brauner et al. . |
| 4,197,020 | 4/1980 | Doherty, III . |
| 4,307,054 | 12/1981 | Chion et al. . |
| 4,414,276 | 11/1983 | Kiriyama et al. . |
| 4,869,849 | 9/1989 | Hirose ................................. 366/340 |

OTHER PUBLICATIONS

W. E. Fitzgerald and J. P. Knudsen, "Mixed-Stream Spinning of Bicomponent Fiber", *Textile Research Journal*, vol. 37, pp. 447–453, Jun. 1967.

*Primary Examiner*—Robert W. Jenkins

[57] ABSTRACT

A static mixing device includes a stacked arrangement of relatively thin mixing plates which have channels for splitting and changing the direction of a flow of fluid, and exit holes for allowing the fluid to flow to the next plate in the stack, the exit holes in next adjacent plates being offset.

7 Claims, 2 Drawing Sheets

STATIC MIXING DEVICE

BACKGROUND OF THE INVENTION

This invention relates to a static mixing device for homogenizing or blending a single stream of viscous material, e.g., a molten polymer or solution of polymer, to render composition of the material more uniform, or for combining two or more streams of viscous material, e.g., two different molten polymers or solutions of different polymers, to provide a single substantially homogeneous stream.

Static mixers, also referred to in the art as in-line mixers, constitute a well known category of mixing device which typically contain no moving parts but achieve mixing by directing a moving stream against stationary elements which twist and cut the stream or force it through channels or tubes. The multiple subdivisions and recombinations of the stream within a static mixer results in its being homogenized or blended, the extent of uniformity of the mixing being determined by a variety of factors, principally the design and arrangement of the stationary mixing elements and the number of stages in the mixer.

In the fiber-producing industry, static mixers are widely used in connection with a variety of manufacturing operations. Thus, e.g., in spinning a melt or solution spinning operation, a static mixer may be employed to homogenize one or more viscous polymers or a stream of spinning solution ("dope") or to intimately blend two or more such streams to provide a homogeneous stream which is then directed through a spinnerette to provide filaments. Illustrative of spinning assemblies featuring a static mixing device are those described in U.S. Pat. Nos. 2,815,532; 3,458,900; 3,701,619; 3,968,307; 4,134,954; 4,197,020; 4,307,054; and 4,414,276.

Fitzgerald et al., "Mixed-Stream Spinning of Bicomponent Fibers", *Textile Research Journal*, Vol. 37, No. 6, pp. 447–453, June 1967 describes a device for merging spinning solutions used in the manufacture of bicomponent acrylic fibers. The merging device is made up of an assembly of plates in which merger plates, possessing varying patterns of channels and orifices, alternate with spacer plates. The merging device does not result in a true mixing or blending of the two spinning solutions but, as the term "merging" indicates, combines the solutions along their interface to ultimately provide a bicomponent filament or heterofilament. The fiber-forming polymers in the two spinning solutions retain their separate identities in the spun fiber where they may be arranged in a sheath/core or side-by-side pattern. Thus, the Fitzgerald et al. merging device is not, technically speaking, a static mixer. Other devices which merge, but do not homogenize or blend, spinning solutions are described in U.S. Pat. Nos. 3,457,342 and 3,469,279.

SUMMARY OF THE INVENTION

It is an object of the invention to provide a static mixer of modular construction for the homogenization of one or more fluid streams.

It is a particular object of the invention to provide such a static mixer made up, inter alia, of a stacked arrangement of relatively thin mixing plates, the assembled unit taking up less space than known and conventional units of equivalent blending capability.

These objectives and other advantages are achieved by the static mixer of the invention which includes a first plate having channels for receiving one or more directed flows of fluid from a primary direction, the channels split the flow of fluid received by the first plate and direct the split flows of fluid in directions normal to the primary direction of flow. A plurality of exit holes formed within the channels in the first plate provide openings through which the fluid can pass by flowing in the primary direction of flow.

A second plate, next adjacent and parallel to the first plate, has channels for receiving directed flows of fluid emerging from the exit holes in the first plate in the primary direction of flow. The channels in the second plate split the flow of fluid received and direct the split flows in directions generally normal to the primary direction of flow. A plurality of exit holes in the second plate provide openings through which the fluid can pass by flowing in the primary direction of flow. The exit holes in the second plate are offset from the exit holes in the first plate.

Preferably, the mixer of the invention is modular in construction and includes a series of such plates, each having exit holes offset from the exit holes of the plate from which it receives the fluid.

The present invention will be described more fully hereinafter with reference to the accompanying drawings, in which illustrative embodiments of the invention are shown. This invention can, however, be embodied in many different forms and the invention should not be construed as being limited to the specific embodiments set forth herein. Rather, applicant provides these embodiments so that this disclosure will be thorough and complete and will fully convey the scope of the invention to those skilled in the art.

DETAILED DESCRIPTION OF THE PREFERRED EMBODIMENTS

Figure 1:
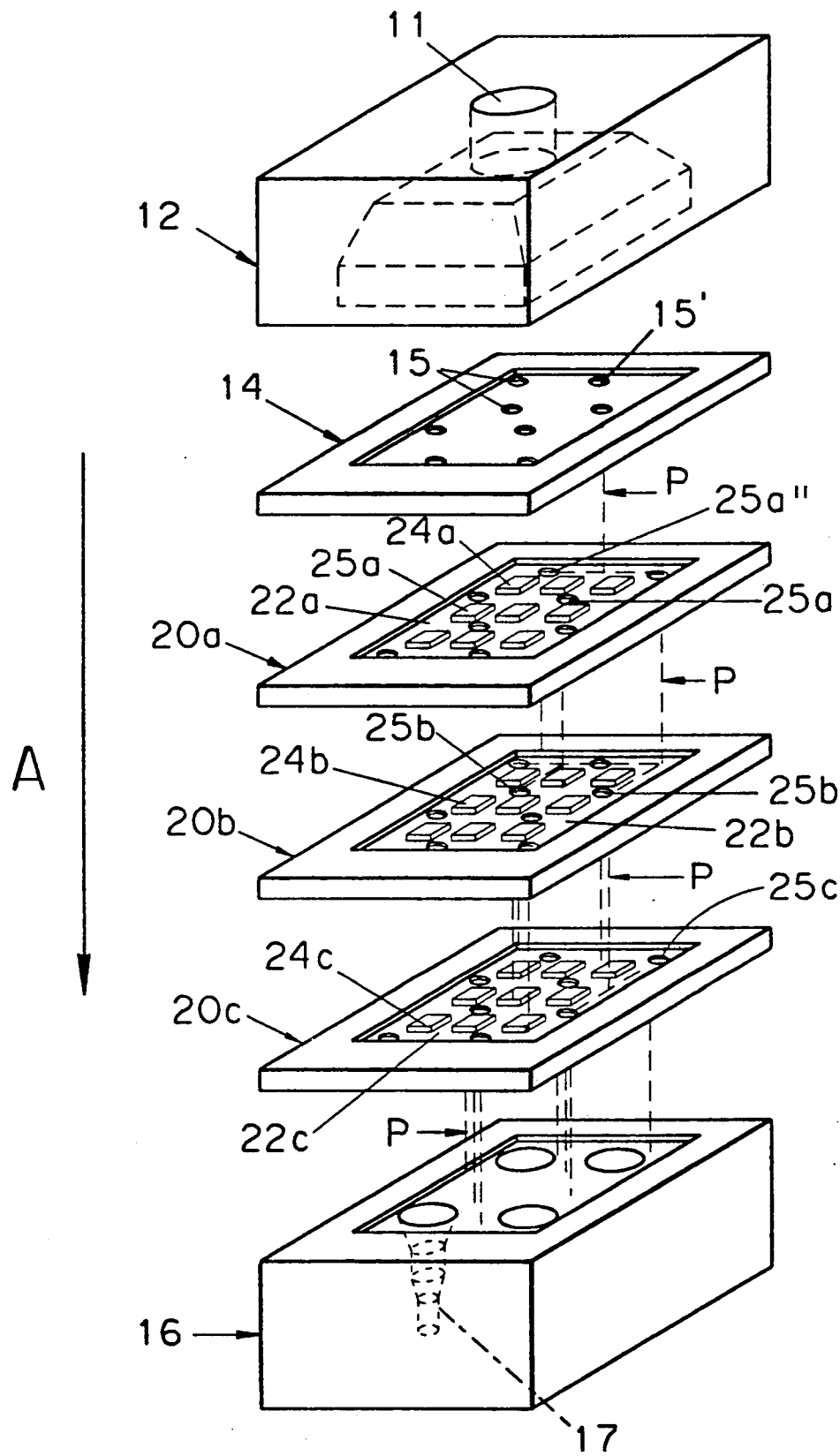
FIG. 1 is an exploded perspective view of the invention in the environment of a spinnerette assembly.

Referring now to the drawings, FIG. 1 illustrates a typical spinnerette assembly including a polymer inlet block 12, a metering or distribution plate 14 and a spinnerette or exit block 16. A static mixer in accordance with the present invention includes mixing plates 20a, 20b and 20c.

The mixing plates 20a, 20b and 20c each include channels 22 which define raised areas or islands 24. Exit holes 25 allow passage of material from one plate to the next.

The mixing plates 20a, 20b and 20c can be manufactured from any suitable material, such as, for example, mild steel, stainless steel, brass or aluminum. The mixing plates and the channels and holes can be formed by any suitable manufacturing technique, such as, for example die cutting, drilling, punching, stamping, etching, machining or molding, or combinations thereof.

The overall dimensions of the mixing plates may vary considerably. In general, the various mixing plates will have the same or substantially the same planar dimension as each other and also as the components of the spinnerette assembly which are adjacent to the mixing plates. While in some instances a spinnerette plate may be as large as a few feet in length, more typically the dimensions of spinnerette plate and the dimensions of each mixing plate may range from about 2.0 to 12.0 inches in length and 1.0 to 8.0 inches in width. The thickness of the mixing plates may be the same or different and may range from 0.015 to 0.5 inches, preferably the thickness of the mixing plates will be between 0.015 and 0.1 inches. The depth of the channels in the mixing plates may also vary, depending on the thickness of the mixing plates themselves. The depth of the channels will normally be from about 20 percent to about 80 percent of the thickness of the mixing plates. The dimensions of the channels should be selected to avoid excessive pressure drops to prevent leaks or damage to the assembly.

When the static mixer of the invention is assembled, the mixing plates 20a, 20b and 20c are stacked and held together in a tight fitting relationship with each other and with the other components of the spinnerette assembly. As a result, the raised islands 24b of mixing plate 20b will sealably contact mixing plate 20a, and the raised islands 24c will sealably contact mixing plate 20b. Those skilled in the art will appreciate that the static mixer of the invention may be placed in a number of positions within the spinnerette assembly. The static mixer may be positioned directly upstream of the spinnerette or exit plate 16 as shown in FIG. 1. Alternatively, a metering or distribution plate may be placed between the static mixer and the spinnerette plate.

Figure 2:
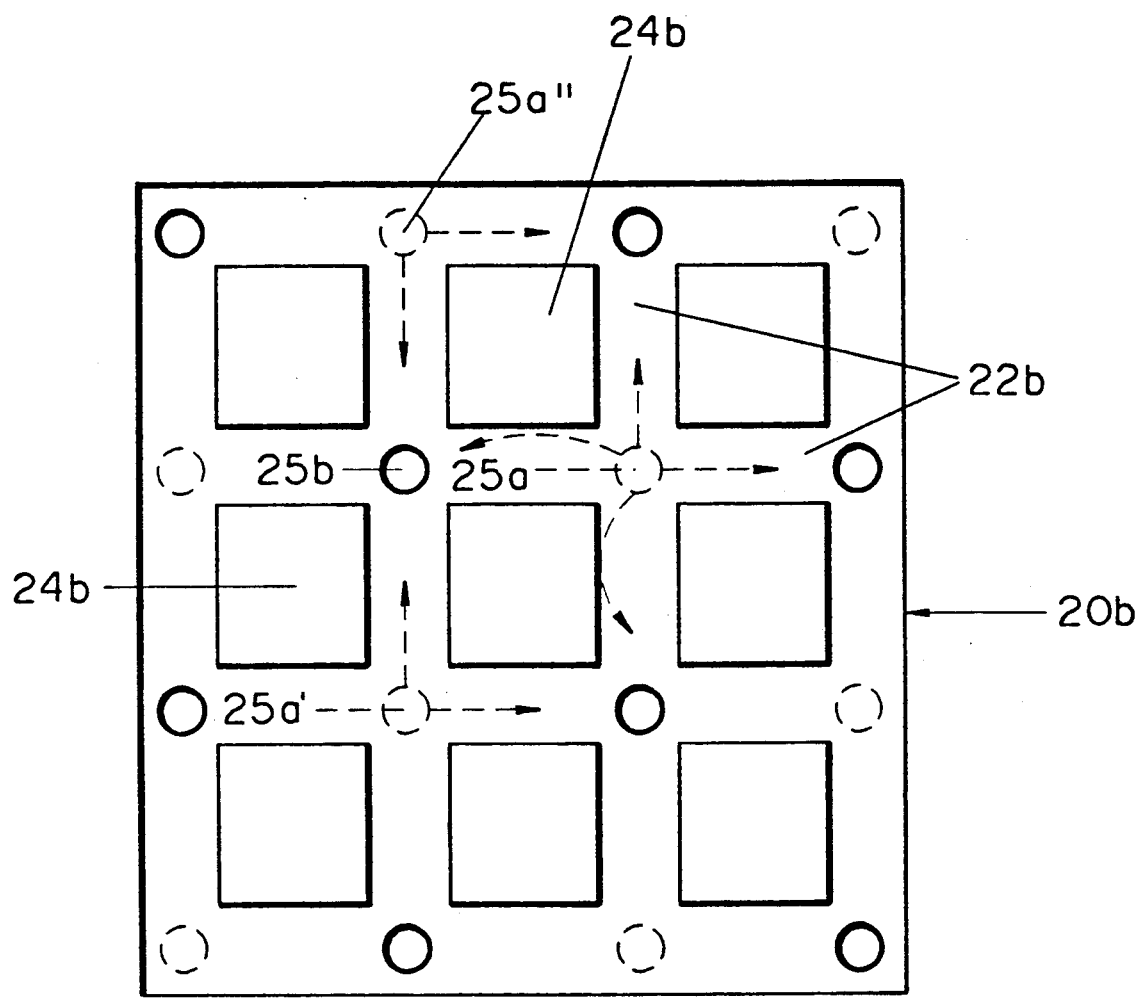
FIG. 2 is a schematic representation of a mixing plate of the invention.

When assembled, the exit holes of any two next adjacent mixing plates should be offset from each other. Having the exit holes offset in next adjacent mixing plates will help minimize the number of plates needed to achieve a given degree of mixing. Thus, as best seen in FIG. 2, the exit holes 25a (shown in dashed lines) of mixing plate 20a are not aligned with exit holes 25b in plate 20b. The exit holes of mixing plates spacially separated within the stack of plates, on the other hand, may be aligned or offset. For example, it is not critical whether the exit holes 25c of mixing plate 20c are aligned with or offset from the exit holes 25a in mixing plate 20a.

Any suitable means may be employed to align the mixing plates in precise registry with each other and the components of the spinnerette assembly and to maintain the static mixer and spinnerette assembly in a tight fitting relationship. Thus, for example, the mixing plates and other components of the spinnerette assembly may include a series of evenly spaced apertures which provide thruways accommodating terminally-threaded aligning bolts or rods which receive locking nuts to hold the assembly together.

In a typical fiber-spinning operation, polymer or other material to be spun is provided to the inlet 11 of polymer block 12, and passes through a number of plates before ultimately exiting through an orifice 17 of a spinnerette plate 16. The general direction between the inlet block and the spinnerette plate will hereinafter be referred to as the "primary direction of flow" represented by Arrow "A". In general terms, the "primary direction of flow" will be a direction substantially normal to and toward the face of the mixing plates having the channels formed therein.

The polymer passes from inlet block 12 to distribution plate 14. The polymer then passes through apertures 15 in distribution plate 14 and is received by channel 22a in mixing plate 20a. When the polymer contacts mixing plate 20a, the polymer no longer flows in the primary direction of flow, but rather now travels in directions substantially normal to the primary direction of flow. The polymer flows through channels 22a, being directed by the raised islands 24a toward exit holes 25a. As the polymer passes through exit holes 25a it is again travelling in the primary direction of flow. The flow from a single aperture 15 of distribution plate 14 will normally be divided into smaller, split flows and directed to a plurality of exit holes 25a in the mixing plate 20a. It should be understood that a plurality of polymer streams or flows will be produced by the apertures 15 in the distribution plate 14, each of which will be divided into smaller or split flows. The split flows from one aperture will collide with the split flows generated by the streams from other apertures to cause the desired mixing in the channels of the mixing plate, particularly as the split flows from different apertures combine when passing through the exit holes of any given mixing plate.

The flow of polymers passing through exit holes 25a in mixing plate 20a is received by channels 22b in mixing plate 20b. When the polymer contacts mixing plate 20b, the polymer is again diverted from the primary direction of flow and directed through channels 22b in directions generally normal to the primary direction of flow toward exit holes 25b. Again, each polymer stream or flow passing through an exit hole 25a in mixing plate 20a is divided into split flows upon contact with mixing plate 25b. The various split flows from the plurality of exit holes 25a collide with one another and produce the desired mixing effect. Thus, for example, as shown in FIG. 2 by the dashed arrows, a portion of the stream of polymer passing through exit holes 25a, 25a' and 25a'' will mix upon passing through exit hole 25b.

The degree of mixing provided by the static mixer of the invention will depend upon the number of mixing plates employed and the number and configuration of the exit holes in the mixing plates. For example, as illustrated by the dashed lines labelled "P" in FIG. 1, a single stream of polymer generated by aperture 15' in distribution plate 14 will be mixed into at least five different streams of polymer generated by mixing plate 20b. By adding a third plate, 20c, further mixing is achieved or evidenced by the fact that the five streams exiting from exit holes 25b in mixing plate 20b are split into the seven streams which pass through exit holes 25c in mixing plate 20c. Thus, by utilizing a relatively small number of thin plates, extensive mixing can be achieved while only a small distance is travelled by the polymer in the direction of primary flow. While the number of mixing plates making up the static mixer is considered unlimited, at some point the resulting pressure drop will become unreasonable. Preferably, the static mixer includes between two and twenty mixing plates. Most preferably, the static mixer includes three to ten mixing plates.

It should be understood that while the invention has been described with regard to the mixing of a single fluid, two or more fluids could be mixed together by the static mixer of the invention simply by supplying more than one component to either inlet block 12 or distribution plate 14.

The foregoing description is to be considered illustrative, rather than restrictive of the invention, and those modifications within the meaning and range of equivalence of the claims ar to be included therein.

What is claimed is:

1. A static mixer comprising:
   a plurality of plates stacked adjacent one another;

each said plate having channels for receiving one or more directed flows of fluid from a primary direction, said channels having means for splitting the flows of fluid and directing the split flows in directions substantially normal to the primary direction;

each plate having a plurality of exit holes formed within said channels through which the fluid can pass by flowing in the primary direction, said exit holes in each said plate being offset from the exit holes in any plate stacked next adjacent thereto.

2. A static mixer as in claim 1 comprising between two and twenty stacked plates.

3. A static mixer as in claim 1 comprising between three and ten stacked plates.

4. A static mixer as in claim 1 wherein channels in the first plate in the stack receive a plurality of directed flows, the flows being comprised of at least two different fluids.

5. A static mixer comprising:

a first plate having channels for receiving one or more directed flows of fluid from a primary direction;

said channels having means for splitting the flow of fluid received in said first plate and directing the split flows in directions substantially normal to the primary direction;

a plurality of exit holes formed within said channels in said first plate through which the fluid can pass by flowing in the primary direction;

a second plate next adjacent to said first plate;

said second plate having channels for receiving directed flows of fluid from said exit holes in said first plate;

said channels on said second plate having means for splitting the flow of fluid received in said second plate and directing the split flows in directions substantially normal to the primary direction;

a plurality of exit holes formed in said second plate through which the fluid can pass by flowing in the primary direction; and said exit holes in said second plate being offset from said exit holes in said first plate.

6. A static mixer as in claim 5 wherein a plurality of directed flows are received by said first plate, the flows being comprised of at least two different fluids.

7. A static mixer for mixing one or more viscous polymers prior to the spinning of the polymer by a spinnerette plate, the mixer comprising:

a plurality of plates stacked adjacent one another and positioned upstream from the spinnerette plate, each plate having channels for receiving one or more directed flows of polymer from a primary direction, said channels having means for splitting the flows of polymer and directing the split flows in directions substantially normal to the primary direction, each plate having a plurality of exit holes formed within said channels through which the polymer can pas by flowing in the primary direction, said exit holes in each said plate being offset from the exit holes in any plate stacked next adjacent thereto.

* * * * *